United States Patent
Kerstein

(10) Patent No.: US 10,277,890 B2
(45) Date of Patent: Apr. 30, 2019

(54) SYSTEM AND METHOD FOR CAPTURING AND VIEWING PANORAMIC IMAGES HAVING MOTION PARALLAX DEPTH PERCEPTION WITHOUT IMAGE STITCHING

(71) Applicant: Dustin Kerstein, Boston, MA (US)

(72) Inventor: Dustin Kerstein, Boston, MA (US)

(*) Notice: Subject to any disclaimer, the term of this patent is extended or adjusted under 35 U.S.C. 154(b) by 119 days.

(21) Appl. No.: 15/625,594

(22) Filed: Jun. 16, 2017

(65) Prior Publication Data

US 2017/0366803 A1 Dec. 21, 2017

Related U.S. Application Data

(60) Provisional application No. 62/351,730, filed on Jun. 17, 2016.

(51) Int. Cl.
*H04N 13/282* (2018.01)
*H04N 13/204* (2018.01)
(Continued)

(52) U.S. Cl.
CPC ......... *H04N 13/282* (2018.05); *H04N 5/2252* (2013.01); *H04N 5/23238* (2013.01);
(Continued)

(58) Field of Classification Search
CPC ......... H04N 2213/001; H04N 13/0018; H04N 13/0203; H04N 13/0282; H04N 13/0447;
(Continued)

(56) References Cited

U.S. PATENT DOCUMENTS 5,138,460 A 8/1992 Egawa
5,745,126 A 4/1998 Jain et al.
(Continued)

FOREIGN PATENT DOCUMENTS

JP 2003264740 9/2003
WO WO1996031047 10/1996
(Continued)

OTHER PUBLICATIONS

International Search Report dated Sep. 7, 2017 for International Application No. PCT/US17/37765.
(Continued)

*Primary Examiner* — Anner N Holder
(74) *Attorney, Agent, or Firm* — F. Chau & Associates, LLC

(57) ABSTRACT

A system for acquiring a sequence of image frames for display having depth perception through motion parallax includes a base unit, a stage unit, and a camera unit. The stage unit is disposed over the base unit and is configured to rotate, with respect to the base unit, about an axis of rotation, and is configured to hold the camera element thereon at a predetermined offset, as measured from the axis of rotation to a no-parallax point or least-parallax point of the camera element. The camera element is configured to acquire a sequence of image frames, as it is rotated about the axis of rotation by the stage unit and is kept at the predetermined offset, and is configured to acquire the sequence of image frames during the rotation. The predetermined offset is a positive distance value.

15 Claims, 10 Drawing Sheets

(51) Int. Cl.
*H04N 13/351* (2018.01)
*H04N 13/239* (2018.01)
*H04N 5/225* (2006.01)
*H04N 5/232* (2006.01)

(52) U.S. Cl.
CPC ......... *H04N 13/204* (2018.05); *H04N 13/239* (2018.05); *H04N 13/351* (2018.05); *H04N 2213/001* (2013.01)

(58) Field of Classification Search
CPC .. H04N 13/204; H04N 13/239; H04N 13/282; H04N 13/351; H04N 5/2252; H04N 5/23238
See application file for complete search history.

(56) References Cited

U.S. PATENT DOCUMENTS

| | | | |
|---|---|---|---|
| 5,963,664 | A | 10/1999 | Kumar et al. |
| 6,549,681 | B1 | 4/2003 | Takiguchi et al. |
| 6,677,981 | B1 | 1/2004 | Mancuso et al. |
| 7,064,783 | B2 | 6/2006 | Colavin et al. |
| 7,424,218 | B2 | 9/2008 | Baudisch et al. |
| 9,185,391 | B1 | 11/2015 | Prechtl |
| 2005/0270284 | A1* | 12/2005 | Martin ............. H04N 13/221 345/419 |
| 2007/0014347 | A1 | 1/2007 | Prechtl et al. |
| 2007/0081081 | A1 | 4/2007 | Cheng |
| 2007/0264004 | A1 | 11/2007 | Dagget |
| 2009/0310851 | A1 | 12/2009 | Arcas et al. |
| 2010/0054628 | A1 | 3/2010 | Levy et al. |
| 2010/0194851 | A1 | 8/2010 | Pasupaleti et al. |
| 2010/0251101 | A1 | 9/2010 | Haussecker et al. |
| 2010/0265313 | A1 | 10/2010 | Liu et al. |
| 2011/0273369 | A1 | 11/2011 | Imai et al. |
| 2012/0133639 | A1 | 5/2012 | Kopf et al. |
| 2014/0240465 | A1 | 8/2014 | Kawase et al. |
| 2015/0130800 | A1 | 5/2015 | Holzer et al. |
| 2015/0339324 | A1* | 11/2015 | Westmoreland ............. G06F 17/30268 707/733 |
| 2015/0339846 | A1 | 11/2015 | Holzer et al. |
| 2016/0330376 | A1* | 11/2016 | Debevec ............. H04N 5/2251 |

FOREIGN PATENT DOCUMENTS

| | | |
|---|---|---|
| WO | 99/18725 | 4/1999 |
| WO | WO2015073570 | 5/2015 |

OTHER PUBLICATIONS

Cha Zhang, et al., "Improving Depth Perception With Motion Parallax and Its Application in Teleconferencing," Multimedia Signal Processing, 2009. MMSP '09. IEEE International Workshop, Oct. 5-7, 2009, pp. 1-6.
http://www.livepanoramas.com/, as printed on Jun. 12, 2017.
http://www.photospherix.com/, as printed on Jun. 12, 2017.
https://www.ptgui.com/, as printed on Jun. 12, 2017.

* cited by examiner

SYSTEM AND METHOD FOR CAPTURING AND VIEWING PANORAMIC IMAGES HAVING MOTION PARALLAX DEPTH PERCEPTION WITHOUT IMAGE STITCHING

CROSS-REFERENCE TO RELATED APPLICATION

The present application is based on provisional application Ser. No. 62/351,730 filed Jun. 17, 2016, the entire contents of which are herein incorporated by reference.

TECHNICAL FIELD

The present disclosure relates to panoramic images and, more specifically, to systems and methods for capturing and viewing panoramic images having motion parallax depth perception, without image stitching.

DISCUSSION OF THE RELATED ART

Panoramic photography is a photographic technique that creates images with a relatively large field of view that often include imagery from multiple unique photos. Panoramic photography may be captured on film using various techniques by which the photographic film is exposed by substantially non-overlapping frames, each taken from a slightly different angle and/or position. The exposed film may then be developed and finished, with the final print having a very wide field of view.

More recently, techniques for capturing and displaying panoramas using digital photography have been developed. According to these techniques, a set of image frames are captured, each from a slightly different angle and/or position, and these images are digitally combined, using software, in a process called image stitching. This software can optimize the yaw/pitch/roll of each frame and correct any lens distortion, resulting in a higher quality and more correctly aligned panorama compared to older film techniques. An example of a suitable software tool for performing image stitching is PANORAMA TOOLS ("PanoTools"), developed by Helmut Dersch. Examples of other suitable software tools include PTGui, Autopano, and Hugin.

A wide range of camera setups may be used for acquiring panorama images. Some of these setups use multiple cameras that are fixed in a single position. Other setups involve the use of a single camera and a rig designed to rotate the single camera about an axis of rotation while the camera captures image frames. Still other approaches involve the use of a smartphone camera, with the user being instructed, by an application running on the smartphone, to change the orientation of the smartphone as the image is acquired.

Panoramas may also capture motion using multiple unique stitched panoramic frames forming a panoramic video. Also, three-dimensional ("3D") stereoscopic stitched panoramas can be captured using single and multi-camera systems. However, existing approaches for stitched panoramas may suffer from several disadvantages. For example, stitched panoramas may suffer from parallax error, in which contiguous image frames show different relative distances between objects of differing distances from the camera. Parallax errors may be compensated for, to some degree, by the use of processing software which attempt to blend the seams between contiguous frames or techniques such as optical flow, however, this processing may be computationally expensive and compensation may be somewhat inadequate, resulting in visible artefacts that are visually distracting. Additionally, the resulting stitched panoramas would have a single, fixed perspective. While parallax error may be avoided by rotating a single camera/lens about its no parallax point ("NPP"), in cases of stitched 3D panoramic images captured using a rotated dual camera system or a non-rotated multi-lens camera system, each camera/lens would have its own NPP, thereby precluding rotation about a single NPP and resulting in unavoidable parallax stitching errors and artefacts.

Stitched panoramas taken with a rotating camera may also be subject to temporal errors, in which part of the scene has moved as the various image frames are captured. For example, if a car is present in a first frame taken at time=1 and that first frame is stitched with a second frame taken at a time=2, in which the car is no longer present, the stitched panorama may include only a portion of the car, with the remaining portion of the car seemingly missing from what could be the center of the image.

SUMMARY

A system for acquiring a sequence of image frames for display having depth perception through motion parallax includes a base unit, a stage unit, and a camera unit. The stage unit is disposed over the base unit and is configured to rotate, with respect to the base unit, about an axis of rotation, and is configured to hold the camera element thereon at a predetermined offset, as measured from the axis of rotation to a no-parallax point or least-parallax point of the camera element. The camera element is configured to acquire a sequence of image frames, as it is rotated about the axis of rotation by the stage unit and is kept at the predetermined offset, and is configured to acquire the sequence of image frames during the rotation. The predetermined offset is a positive distance value.

A method for acquiring and displaying a sequence of unstitched images includes rotating a camera unit about an axis of rotation such that a distance between the axis of rotation and a no-parallax point or least-parallax point of the camera unit is fixed to a predetermined offset. A sequence of image frames is acquired using the camera unit as the camera unit is rotated about the axis of rotation. Each of the sequence of image frames is sequentially displayed to a viewer, without stitching the sequence of image frames into a single panorama. The predetermined offset is a positive distance value.

A method for acquiring a panorama includes rotating a camera unit about an axis of rotation such that a distance between the axis of rotation and a no-parallax point or least-parallax point of the camera unit is fixed to a predetermined offset. A sequence of image frames is acquired using the camera unit as the camera unit is rotated about the axis of rotation. The acquired sequence of image frames is processed for display.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1A:
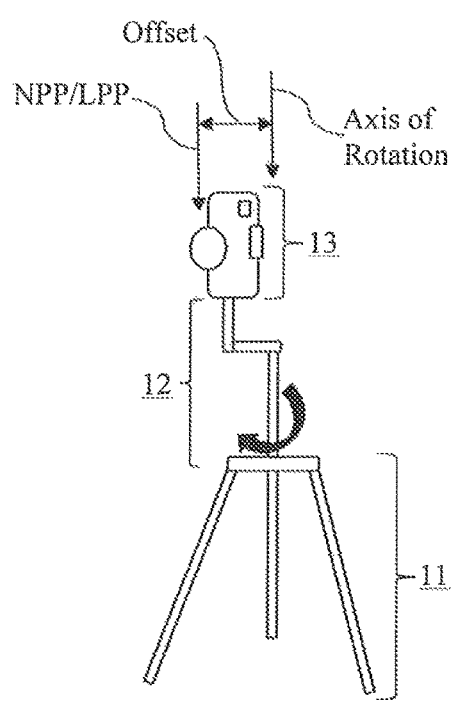
FIG. 1A is a schematic diagram illustrating an image capture apparatus according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide an approach for capturing and viewing a panoramic image in such a way as to provide depth perception in the form of motion parallax, without the use of image stitching. In this way, a viewer may be able to view a panoramic image sequence, either two-dimensional ("2D") or 3D, either static or with captured motion, without parallax error or temporal error. Computational expense may also be minimized, which may be especially useful for implementing exemplary embodiments of the present invention on mobile electronic devices such as smartphones, virtual reality headsets, and tablet computers. Moreover, while the panoramic image sequence may be viewed without parallax error, the image sequence may still be viewed with parallax, which is to say, as the viewing angle changes, the viewer may perceive objects that are farther away changing relative position at a slower rate than objects that are closer to the point of observation. This motion parallax phenomenon may serve to heighten the sense of immersion felt by the viewer and contribute to a positive viewing experience by providing depth perception to the viewer.

Exemplary embodiments of the present invention may include a method and system for capturing and viewing an unstitched panoramic image sequence. The method may be performed in three stages. The first stage is image acquisition. The second stage is image processing, and the third stage is image display. The system may include an image acquisition apparatus, an image processing apparatus, and an image viewing apparatus.

It is to be understood, however, that image processing may be performed substantially simultaneously with either image acquisition or image display, and that in either event, all three steps may be performed on a same device, such as a smartphone.

Exemplary embodiments of the present invention may implement the system as three different components (e.g. one system for acquiring the image data, one system for processing the image data, and one system for viewing the data). However, exemplary embodiments may combine these components into just one or two systems. According to one exemplary embodiment of the present invention, a first apparatus may be used to acquire the image data and a second apparatus may be used to process and display the acquired image data. According to another approach, a single device may be used to perform all three functions.

Exemplary embodiments of the present invention may acquire multiple image frames using an image capture device such as a dedicated camera or a smartphone device. FIG. 1A is a schematic diagram illustrating an image capture apparatus according to an exemplary embodiment of the present invention. The image capture device 10 may include three elements: there may be a base unit 11, which may be, for example, a tripod stand. A rotating stage and/or rig 12 may be disposed on the base unit 11 and may serve to rotate, either under manual own power or by electronic actuation. The stage and/or rig unit 12 may also include an adjustable element for offsetting a camera element 13 mounted thereon. The adjustable offsetting element may allow the camera element 13 to be offset from the axis of rotation of the stage and/or rig 12, and more particularly, the adjustable offsetting element may allow the camera element 13 to be offset by a particular distance, as measured from the axis of rotation to the NPP of the camera element 13. This offsetting may be controlled either under manual power or by electronic actuation. Where electronic actuation is used both for the rotating and the offsetting, actuation may be computer-controlled to calculate and carry out the desired degree of rotation and offsetting. Moreover, a controlling device, which may be disposed within the stage and/or rig 12, may further control the shutter, or may otherwise control the image acquisition, of the camera element 13, for example, by using a Bluetooth control module.

By allowing the photographer to adjust the offset from the lens' NPP/LPP, the amount of parallax captured can be controlled. This allows the photographer to capture as little as zero parallax, less than an ordinary human-observable level of parallax (e.g. useful for macro or miniature photography), or greater than ordinary human-observable parallax (e.g. for exaggerated depth perspective).

Exemplary embodiments of the present invention may provide a user-controlled setting/metadata that allows the user to directly control/modify the frame alignment system to achieve better frame to frame alignment. When frames are captured with parallax (offset from NPP), the only depths that might perfectly alignment between contiguous frames are depth=infinity. All other subjects at depths<infinity may have varying levels of misalignment resulting in a visual "jump" between contiguous frames. For example, if the majority of the captured rotation contains depth t=10 ft, then the alignment system may be modified to provide perfect alignment at depth=100 ft at the expense of misalignment at other depths.

This adjustment may be exposed as a "Target Alignment Depth" which defaults to "Infinity" and allows an arbitrary depth measurement in feet/meters/inches/etc. or possibly as a visual alignment assistant where two contiguous frames are presented and the user is provided with a means to adjust the alignment until they are visually satisfied.

This adjustment may be specified for the entire captured rotation, a specific angular region of the rotation as small as two contiguous frames, or multiple unique adjustments for several angular regions.

This adjustment may also be used to compensate for errors that are introduced during the capture/image acquisition process due to environmental factors such as wind, a person disrupting the rotation, or camera system error.

The camera module 13 may be mounted on the stage and/or rig 12 and may thereby be offset by a predetermined amount, as measured from the axis of rotation to the NPP of the camera, and may also be rotated, about the axis of rotation, as images are acquired. In this way, a plurality of images may be acquired at predetermined angles and from a desired non-zero offset from the axis of rotation to the NPP of the camera 13.

As can be seen from FIG. 1A, the stage and/or rig 12 is configured to be adjusted such that the NPP of the camera 13 is displaced from the axis of rotation by a predetermined distance. According to some exemplary embodiments of the present invention, the desired offset may be within the range of 50 mm to 120 mm, and more particularly, within the range of from 65 mm to 110 mm, and more particularly, within the range of from 80 mm to 100 mm.

While the above-described image capture device 10 may be well suited for professional photography, where high-quality digital single-lens reflex (DSLR) cameras are used, other exemplary embodiments of the present invention may use custom hardware.

Figure 1B:
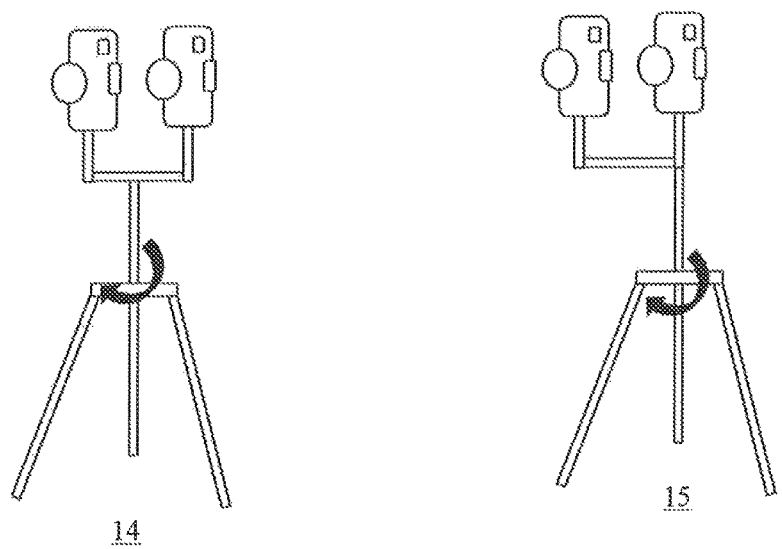
FIG. 1B is a diagram illustrating modified examples of the apparatus illustrated in FIG. 1A.

FIG. 1B is a diagram illustrating modified examples of the apparatus illustrated in FIG. 1A. As can be seen in FIG. 1B, there may be two camera units 13 held in tandem so as to acquire stereographic images for three-dimensional viewing. The two cameras may be arranged such that the axis of rotation is in the center of the space between the two cameras (arrangement 14), or the two cameras may be arranged such that the axis of rotation is substantially aligned with one of the cameras (arrangement 15).

Figure 2:
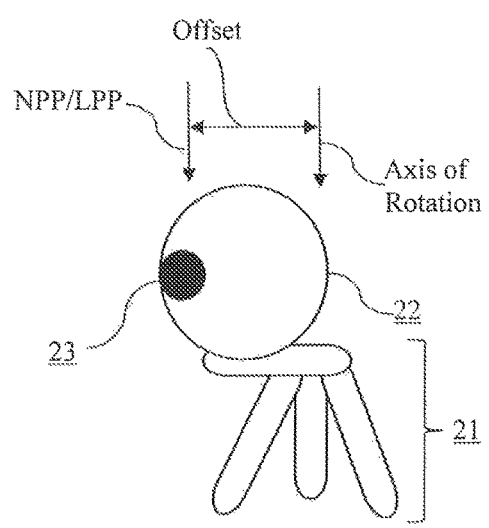
FIG. 2 is a schematic diagram illustrating an integrated image capture device in accordance with exemplary embodiments of the present invention.

FIG. 2 is a schematic diagram illustrating an integrated image capture device in accordance with exemplary embodiments of the present invention. As can be seen from this figure, the integrated image capture device 20 may include a rotating/adjustable base 21, a camera module 22, and a lens unit 23. The base 21 may have an adjustable degree of extension so that the camera module may be moved away and towards the axis of rotation, and in this way, the desired offset may be achieved. However, according to another approach, the adjustment may be made by pulling out or pushing in the lens unit 23 with respect to the camera module 22. In either case, the camera module 22 may rotate about the base 21, either by manual adjustment or electronic actuation. According to one such exemplary embodiment, the camera module 22 may be manually twisted and then a mechanism therein may restore the camera module 22 to its original state, while the images are acquired. In this way, the rotation may be implemented by a wind-up mechanism.

The lens unit 23 may be a wide-angle or fisheye lens, for example, capturing a horizontal angle of view of between 70° and 200°. However, even though the wide-angle lens unit 23 may be able to capture the complete 360° field with as few as two image capture points, exemplary embodiments of the present invention may still acquire many more image at many different angles so as to capture both smoother motion and parallax transitions between contiguous frames, even where consecutive image frames have a very high degree of overlap, as compared to each other. The camera module 22 may also be adjustable so that the starting yaw angle may be set to a desired point.

Figure 3:
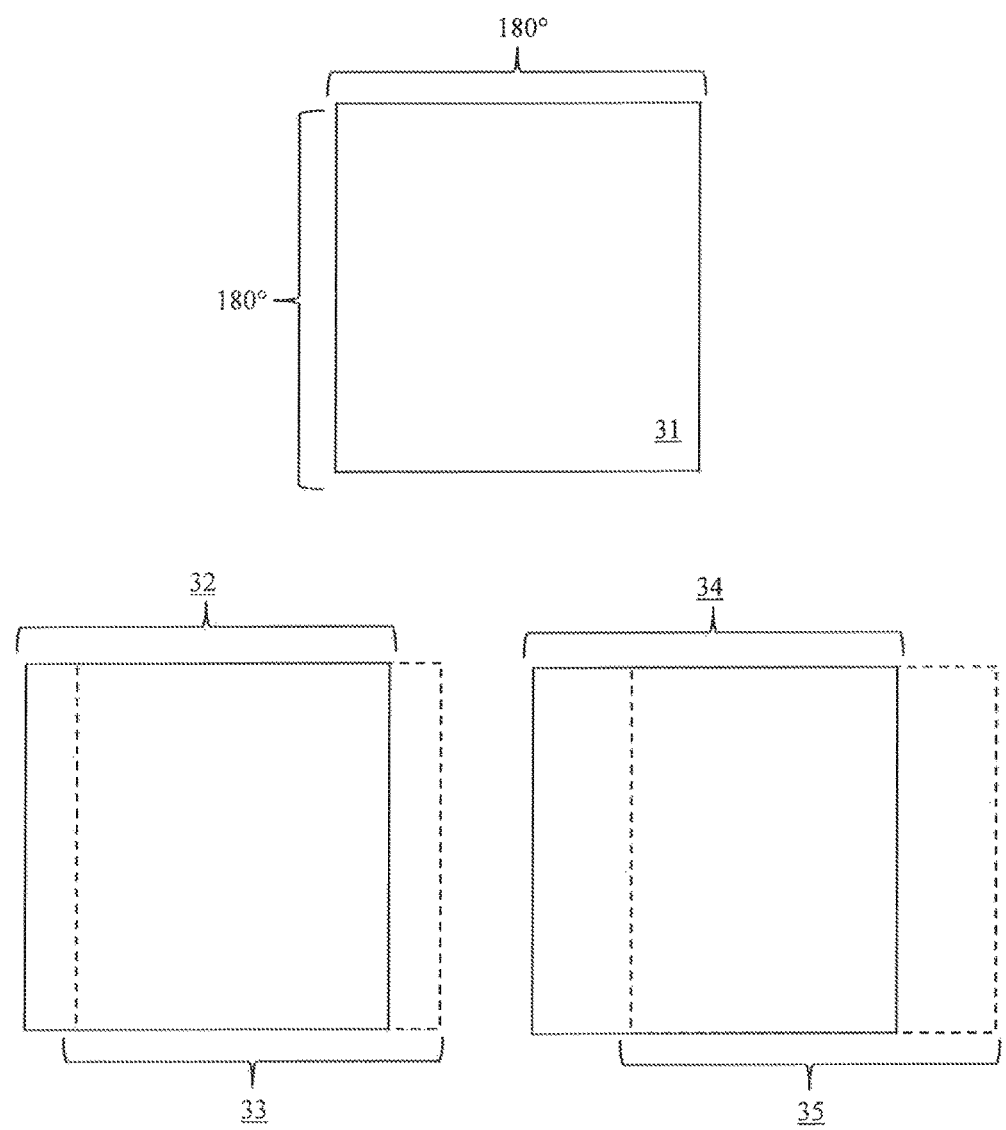
FIG. 3 is a diagram illustrating the concept of overlapping frames in accordance with exemplary embodiments of the present invention.

FIG. 3 is a diagram illustrating the concept of overlapping frames in accordance with exemplary embodiments of the present invention. Each image frame 31 may have an angular width of 180° and an angular height of 180°. Thus each image frame 31 may be an equirectangular frame with a 180×180 FOV. The sequence of image frames may have some desired degree of overlap. For example, proximate image frames 32 and 33 are illustrated as containing 160° of overlap while proximate image frames 34 and 35 are illustrated as containing 130° of overlap. The degree of overlap may be measured in terms of the rotational axis, although the present invention is not necessarily limited to the axis of rotation being horizontal. The axis of rotation may be vertical or otherwise tilted. The sequence of image frames may utilize a constant level of overlap from frame-to-frame, and the illustrated image frames represent different degrees of overlap that may be used over an entire sequence. However, according to some exemplary embodiments of the present invention, different levels of overlap may be used within a single sequence of image frames.

Figure 4:
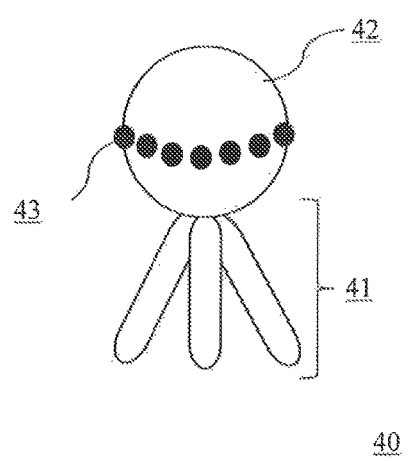
FIG. 4 is a schematic diagram illustrating an integrated image capture device with a plurality of lens units in accordance with exemplary embodiments of the present invention.

FIG. 4 is a schematic diagram illustrating an integrated image capture device with a plurality of lens units in accordance with exemplary embodiments of the present invention. As can be seen, the integrated image capture device 40 may include a base 41, an adjustable camera module 42, and a plurality of lens units 43. The lens units 43 may be spaced completely around a circumference of the base camera module 42 at regular intervals. The circumference of the camera module 42 may be adjustable so as to dilate and constrict. In dilating, each lens unit 43 moves farther from the spherical center of the camera module 42. In constricting, each lens unit 43 moves closer to the spherical center of the camera module 42, and in this way, the desired offset may be achieved. Here, each lens unit 43 may have an independent image sensor.

As an additional or alternative means of providing the desired offset, each lens unit 43 may extend outward and/or inward from the camera module 42. The degree of extension of all lens units 43 may be coupled so that controlling the degree of extension of any one lens unit 43 would similarly control the degree of extension of all lens units.

Rather than physically rotating, the camera module 42 may be configured to sequentially capture images from each of the lens modules 43 so that a set of image frames may still be acquired such that each subsequent image frame represents an increase in acquisition angle and an increase in time. According to another approach, all lens modules 43 may acquire image data substantially at the same time, and continuously, for example, as video files. Then, during image processing, the desired image frames may be extracted to obtain the desired sequence of image frames that advance together in angle and optionally in time.

While the camera module 42 may include any number of lens units 43, there may be 12 lens units 43, each of which including a corresponding image acquisition sensor, disposed at regular intervals around the circumference of the camera module 42, which may be substantially spherical in shape. In this way, the first lens unit may be centered at zero degrees (twelve o'clock), the second lens unit may be centered at 30 degrees (one o'clock), the third lens unit may be centered at 60 degrees (two o'clock), the fourth lens unit may be centered at 90 degrees (three o'clock), etc. so that all 12 lens units are regularly spaced about the circumference of the camera module 42. Then, during image acquisition, the first lens unit may acquire a first image frame at time t=0, the second lens unit may acquire a second image frame at time t=1, the third lens unit may acquire a third image frame at time t=2, . . . , the twelfth lens unit may acquire the twelfth image frame at time t=11. Here each time value may be equal to one second, one particular fraction of a second, or even a value of time larger than one second. It is noted that as the image frames are acquired in succession, even though the camera module 42 includes a plurality of lenses and a corresponding plurality of image sensors, the camera module 42 might only include one set of circuitry for processing and storing image data.

As each of these lens units may have a wide-angle lens of, for example, 70°, the first image frame may cover an angular span from −35° to +35°, the second image frame may cover an angular span from −5° to +65°, . . . , the twelfth image frame may cover an angular span from −65° to +5°. However, exemplary embodiments of the present invention are not to be limited to any particular number of lens units or lens angle of view. Moreover, exemplary embodiments of the present invention are not limited to the use of wide-angle lenses, as the number of lens units increases, the angular span of each lens unit may be reduced.

Moreover, according to some exemplary embodiments of the present invention, the camera module 42 may include a plurality of lens units, but only one image sensor. A rotating mirror may then be disposed inside the center of the camera module 42 so that light from each lens unit may be sequentially reflected to the single image sensor.

As mentioned above, exemplary embodiments of the present invention may utilize an image capture apparatus that captures video images from multiple angles at substantially the same time. When this is the case, image processing may select a sequence of image frames from the set of videos by selecting a first frame from a first video file taken by Camera 1 at time t=1, selecting a second frame from the second video file taken by Camera 2 at time t=2, selecting a third frame from the third video file taken by Camera 3 at time t=3, etc. until the desired angle and/or time is achieved.

Regardless of the manner of apparatus used, the user may manually change the orientation of the image capture device between image frame acquisitions or the movable stage/sequential lens units may move/transition automatically through pre-programmed steps. The user may determine how many frames to take, by what angle to rotate the image capture device between each image frame acquisition, and the speed at which consecutive image frames are captured.

The captured image frames may be stored either individually, for example, as .PNG, .JPG, or .RAW, etc., or may be stored as a single file, for example, as .AVI, .MOV, .MP4, etc.

Each captured image frame may be saved with associated metadata which may include, for example, an angle of acquisition, a field of view measured, a time of acquisition, location data (e.g. GPS coordinates), and gyroscopic and/or accelerometer, etc.

As described above, according to some exemplary embodiments of the present invention, proximate image frames have some degree of overlap of their respective fields of view. For example, where 36 image frames are captured within a 360° horizontal rotation, another image frame is centered at every 10°. As an example, the lens used to capture the image frames may have a 65° horizontal field of view, and so proximate frames may overlap by 55°. However, this specific amount of overlap is not required, as exemplary embodiments of the present invention may utilize image sets encompassing greater/smaller rotation angles and/or images with greater/smaller field of view and/or fewer/more image frames. According to exemplary embodiments of the present invention, the viewing display's FOV mapped to the axis of rotation is kept below the amount of overlap as defined by the formula below, or non-imaged (i.e. black) regions may be visible:

$$\text{overlap} = \text{axis\_rotation\_fov} - (\text{rotation\_degrees}/\text{num\_frames})$$

Example 1 axis_rotation_fov=130 degrees
rotation_degrees=360 degrees
num_frames=200 frames
overlap=130−(360/200)=128.2 degrees Accordingly, the display FOV along the axis of rotation is kept less than 128.2 degrees or uncaptured image (i.e. black) regions may be visible on the edges.

Regardless of the structure of the image capture system being used, the yaw angle (i.e. angle along the axis of rotation) of all image frames may be kept identical throughout the entire capture sequence.

Figure 5:
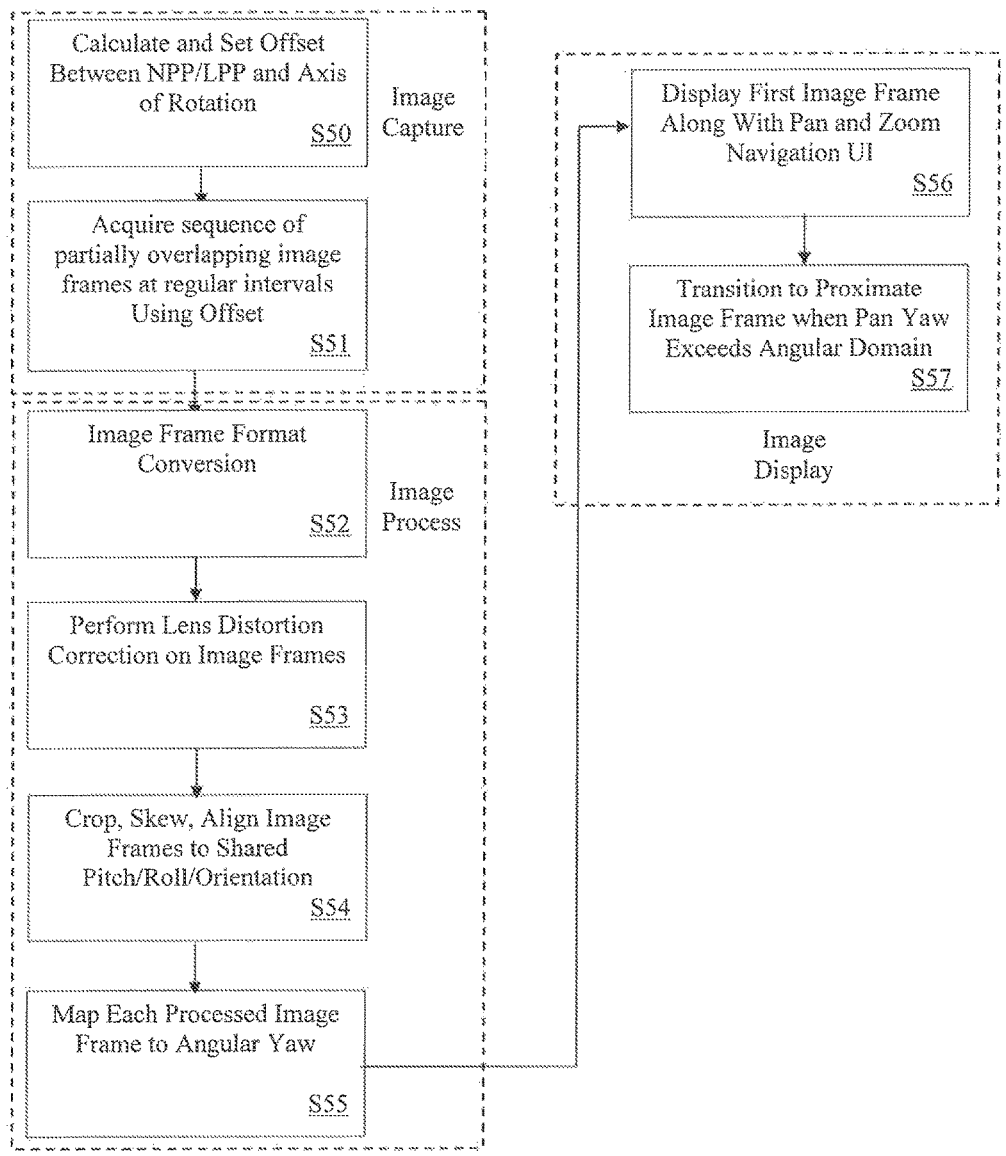
FIG. 5 is a flowchart illustrating a method for acquiring image frames, processing image frames, and viewing image frames in accordance with exemplary embodiments of the present invention.

FIG. 5 is a flowchart illustrating a method for acquiring image frames, processing image frames, and viewing image frames in accordance with exemplary embodiments of the present invention. It is to be understood that these three processes may be performed by three separate systems or they may be performed by two or even a single system.

First, a desired offset may be determined and the image acquisition apparatus may be configured accordingly (Step S50). As mentioned above, the offset may be measured between the axis of rotation and the NPP/LPP of the camera and lens being used. The desired offset may be determined in accordance with the subject matter being photographed. For example, the offset may be greater where the subject matter is farther away from the camera and/or of a larger scale, while the offset may be smaller where the subject matter is closer to the camera and/or of a smaller scale. However, according to some exemplary embodiments of the present invention, the offset may be fixed at or near 80 mm, for example the offset may be within a range of 50-120 mm or 80-100 mm to emulate average human head rotation, and accordingly, the image acquisition apparatus may be adjustable to this point or fixed at this point. The adjustment may be made either manually or automatically, for example, as part of a process similar to autofocusing, in which a distance to the subject is measured. Thus, the desired offset may be dependent upon the distance between the camera and the subject.

A sequence of images may then be acquired (Step S51). As mentioned above, the image frames may be acquired at regular intervals with overlapping angular fields.

Exemplary embodiments of the present invention may process the image frames in the image capture device, in a separate image processing device, in an image display device, or using a cloud-based image processing service. According to one exemplary embodiment of the present invention, a smartphone may be used as the image capture device, the image processing device, and as the image display device. According to another approach, the smartphone may interface with a remote server over the Internet, with the remote server acting as the processing device and the smartphone acting as the image capture device and the image displaying device. According to another approach, a dedicated camera is used as the image capture device, a computer system is used as the image processing device, and the image display device may be a computer accessing the image processing device remotely, for example, over the Internet.

Regardless of the hardware configuration used, image processing may take as input, the multiple image frames, and may output a series of processed image frames that may also be either single image files or a motion picture file.

As discussed above, each acquired image frame has a field of view that partially overlaps with proximate image frames and each image frame is captured at a known relative time, central angle, and possibly other metadata as described above. For example, where 36 image frames are captured about a 360° horizontal rotation over a period of one minute, each image frame may be separated by 1.667 seconds, the central angle of each image frame may be 10°apart, and each image frame may have been captured with an exemplary lens having a horizontal field of view of 65°. Therefore, a first image frame may capture a field of view from between 0° and 65°, at time t=0 seconds while a second image frame may capture a field of view from between 10° and 75° at a time t=1.667 seconds, etc.

According to some exemplary embodiments of the present invention, some or all of this information might not have been saved at the time of acquisition. In these cases, image processing may estimate this data by analyzing the image. Where multiple image frames do not share an identical pitch/roll orientation, image processing may crop, skew, or align each image frame so as to make the pitch/roll orientation identical between each image frame. However, this step may be optional as some users may wish to have orientation change from frame-to-frame for creative reasons.

While the order in which image processing steps are to be performed need not be outcome determinate, exemplary embodiments of the present invention may process the acquired images for viewing by performing image frame format conversion (Step S52). In this step, image projections may be converted from formats such as rectilinear, equirectangular, cubemap, fisheye, etc. to a desired viewing projection surface. Viewing projections may include 2D plane for rectilinear image frames, sphere projections for equirectangular image frames, cube projections for cubemap, etc.

Additionally, image processing may also include various other image processing steps, such as lens distortion correction, etc. (Step S53). To the extent that the image frames may diverge in field of view, acquisition angles, etc., one or more image frames may be cropped, skewed, aligned so that all image frames share a common pitch, roll, etc. (Step S54).

In performing image processing, each image frame may be mapped to a particular angular yaw position along the axis of rotation (Step S55). The yaw position of each frame may be derived using various techniques. For example, the angle may be measured at the capture time using gyroscopic and/or accelerometer sensors and this information may be stored in each frame's metadata. This data may also be gleaned from the rotating stage and/or actuator(s). The angles for each frame may also be statically defined using a rotation platform with fixed degree increments. The angles may also be calculated using photographic mosaic stitching software that generates alignment control points between overlapping frames, thus determining their yaw position. The angles may also be calculated by the following formula where, for example, all frames were captured equidistantly around a 360 degree rotational axis:

$$180*(totalFrames-currentFrame)/(totalFrames/2)$$

Example 2 totalFrames=5
Frame 1 positioned at 180*(5−1)/(5/2)=288 degrees
Frame 2 positioned at 180*(5−2)/(5/2)=216 degrees
Frame 3 positioned at 180*(5−3)/(5/2)=144 degrees
Frame 4 positioned at 180*(5−4)/(5/2)=72 degrees
Frame 5 positioned at 180*(5−5)/(5/2)=0 degrees It should be noted that the above techniques do not take into account multiple revolutions or rotations less than 360°. For example, in cases of multiple revolutions, defining which frame index represents a complete 360° revolution, and defining the total angular degrees captured would be performed. For cases where there is less than a single complete 360° revolution, defining the total angular degrees captured would be performed.

Where image acquisition is performed using one or more of the exemplary systems described above, the image acquisition system need not perform the above-described image processing steps. A user may take the raw data from the image acquisition system and transfer it to an image processing system. The image processing system may be, for example, instantiated as a cloud-based service. The image processing system may be instantiated as a smartphone device or a personal computer executing a particular application. The image processing system may alternatively be instantiated as a processing device incorporated into the image acquisition system.

After the image has been processed, a user may wish to view the processed images in a non-stitched manner. This may be performed by a viewing device, which may be a third system, although, as mentioned above, one or more of these three systems may certainly be combined into a single device. However, according to one exemplary embodiment of the present invention, the viewing device may be a smartphone, a tablet computer, or a personal computer such as a desktop computer or a laptop PC.

As image stitching is not performed, allowing for visualized motion and motion parallax, exemplary embodiments of the present invention may be able to provide the viewer with a more realistic sensation of the panorama at the time of viewing. This may be performed, for example, by displaying image frames in sequence, using a display apparatus, rather than by displaying a stitched image (Step S56). The display presented to the user may have an aspect ratio different than that of the image frame being displayed and the display presented to the user may also exhibit a level of zoom. The user may have the ability to adjust the level of zoom to a desired level and the user may have the ability to pan left, right, up, and down, or to any arbitrary angle, to create a sensation of an ability to move around within the imaged scene.

As described above, the sequence of image frames may include image frames obtained from slightly different angles, and therefore, the full sequence of image frames may span a desired rotational degree, which may be up to 360°, and may even span more than 360° if the camera captured image frames while being rotated in more than a complete circle.

According to exemplary embodiments of the present invention, as the viewer pans along the rotational axis (which may also be contemplated as panning clockwise or counterclockwise), the display presented to the viewer may advance to subsequent image frames or revert to previous image frames according to a predetermined logic (Step S57).

For the purposes of providing a simplified and concise explanation, exemplary embodiments of the present invention are described herein in terms of the camera rotating clockwise during image acquisition, although it would certainly be possible for the camera to rotate counter-clockwise during image acquisition. Thus, as the viewer navigates clockwise in the display presented to the viewer, the captured scene may appear to advance in time, while as the viewer navigates counterclockwise in the display presented to the viewer, the captured scene may appear to go backwards in time. However, as the full set of image frames may be acquired within a relatively short period of time (e.g. on the order of several seconds or less), the sensation of moving forward or backward in time may be minimized. However, as the user may determine the time interval between image frame acquisitions, the extent of moving through time felt by the viewer in the image display may be a matter of creative choice.

As discussed above, the viewer may have the ability to adjust zoom, pan along the captured rotational axis (e.g. clockwise and counterclockwise) and pan along the non-rotational axis. The extent to which the displayed view may be panned along the non-rotational axis may be dependent upon the extent of zoom presently applied and the captured angular view of the lens used. If the view is fully zoomed out, movement along the non-rotational axis may not be an option.

As discussed above, the viewer may control movement along the rotational axis, however, whether the display apparatus implements this instruction by panning within a single image frame or by changing image frames depends on the display's FOV, the display's pixel resolution, the number of frames, and the FOV of the frames along the rotational axis. As discussed above, the rotational degrees of the full set of image frames may be any arbitrary angle, but here is described as 360°. The full set of image frames may also be arbitrary, but here is described as including 36 image frames. Each image frame is assigned an angular domain that is calculated by dividing the degrees_rotation (e.g. 360°) by the total number of frames (e.g. 36) to arrive at the angular domain for each image frame (e.g. 10°). The center of the first image frame may be defined as any arbitrary angle and may well be 0°, however, for the purpose of this description, the center of the first image frame may be defined as ½ of the angular domain (e.g. 5°) so that the angular domain of the first image frame is said to span from 0° to 10° (if the center of the first image frame were to be set as 0° then the angular domain of the first image frame would span from −5° to +5°).

Therefore, each image frame is assigned an angular domain that does not overlap with the angular domains of the prior and next image frames. Then, as the viewer moves left and right, the viewer may be panning within a single image frame, which may be referred to herein as "FOV scanning," until the viewer has reached the maximum angle of the domain of the present image frame, at which time the next image frame is displayed. The next image frame may be displayed with a level of zoom and panning adjustment along the non-rotational axis that is exactly equal to the way the prior image frame was displayed so that the transition is virtually undetectable to the viewer. However, the parallax of the next image frame may be slightly different and so the viewer may have a sensation of realistic movement as the frames transition.

For example, where there are 360 image frames within a total rotational degree span of 360°, the angular domain of each image frame may be equal to 1°. Regardless of the total number of image frames, exemplary embodiments of the present invention may always be able to transition from one frame to the next as all image frames are expected to have partially overlapping fields of view. However, the more image frames there are, the more smoothly parallax will appear during frame transitions. This is true up until the point at which the total number of image frames is such that the angular domain of each image frame is equal in angular size to a single pixel of the viewing display, as there would no longer be any benefit in terms of parallax smoothness by adding additional image frames beyond that point. Accordingly, the resolution of the acquired image may determine a maximum number of image frames desired for a given rotational degree span. The higher the resolution of the acquired image, the more additional image frames may be used to help smooth parallax during image frame transition.

While the above approach utilizes image frames that are spaced equally in terms of angular field, the present invention is not so limited and some exemplary embodiments of the present invention may utilize a plurality of image frames with various different angular fields. According to this approach, the angular field represented in each image frame may be stored as metadata therewith and in viewing, this metadata may be utilized to determine frame transition, with some frames transitioning after a greater amount of rotation than other frames. This metadata may also be used in the streaming optimizations such that the streaming algorithm provides more frame density to regions of interest or as required by the photographer.

Figure 6:
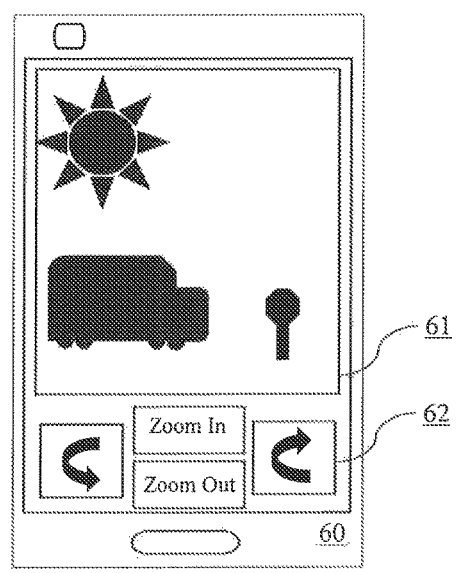
FIG. 6 is a diagram illustrating a user interface for viewing unstitched panorama on a mobile device such as a smartphone or tablet computer in accordance with exemplary embodiments of the present invention.

As discussed above, exemplary embodiments of the present invention may allow for the viewing of the unstitched panorama using a smartphone device, although other display apparatuses may be equally used. FIG. 6 is a diagram illustrating a user interface for viewing unstitched panorama on a mobile device such as a smartphone or tablet computer in accordance with exemplary embodiments of the present invention. The apparatus 50 may have a display device on which the unstitched panorama is displayed 61 alongside a user interface 62. The panorama display 61 may include a present frame, panned and zoomed to the extent desired by the user. The user interface 52 may include rotation keys for rotating clockwise and counterclockwise, as well as keys to zoom in or out. According to some exemplary embodiments of the present invention, the image viewing device may utilize one or more gyroscopes and/or accelerometers to simulate a natural view based on the orientation of the user/viewing device. Other elements may also be included, and the user interface may be hideable. According to other exemplary embodiments of the present invention, the user interface might be hidden and the user may control display via voice commands, physical buttons/controls, or gestures.

While it is contemplated that exemplary embodiments of the present invention would use hundreds of image frames to create smooth parallax transitions, exemplary embodiments of the present invention will be described by the use of 36 image frames captured along a horizontal and clockwise 360° rotation for simplicity. Thus, as described above, the angular domain of each image frame may be 10°. Assuming that when the user starts the image display on the first image, the displayed FOV is at some level of zoom that corresponds to a FOV that is less than the FOV overlap between contiguous images, and is centered at 0° with an angular domain from −5° to +5°. As the viewer pans left and right, the displayed field's center may move. When the center moves past +5° the second frame is displayed. When the center moves past +15° the third frame is displayed, and so on. The user may similarly move in the opposite direction and the prior image frames may be displayed. Where the total rotation degree span is 360°, moving the center past 355° may transition back to the first image frame and moving the center to less than −5° may transition to the last image frame (again assuming the center of the first image frame is set to 0°).

The above described FOV scanning and image switching technique enables seamless alignment in real time on playback between contiguous frames and results in a significantly smoother viewing experience compared to simply cycling between contiguous frames.

The calculated angular domain corresponds to perfect alignment for images captured with zero parallax, or for images captured with parallax along the axis of rotation and subjects in the scene at distance=Infinity. For images with parallax along the axis of rotation, perfect alignment of subjects not at distance=Infinity occurs at a different point than the above calculated angular domain and depends on the subject depth.

In cases of a complete 360 degree rotation (or in cases where there are multiple complete 360 degree rotations) transitioning forward or backward across the break that separates the last image frame from the first image frame may be handled in any of a number of ways to ease the transition that may include a jump in capture time that is as long as the total time separating the acquiring of the first image frame from that of the last image frame. These techniques may include, (1) an opacity fade between beginning/end frames so they appear to seamlessly transition into each other, (2) a fade to/from a solid color (e.g. black) to signify the transition to the viewer, etc.

Where the total captured rotation is less than 360°, movement past the end of the first or last image may be blocked. For example, where the total horizontal rotation of the camera during image acquisition is 180° and there are 18 image frames spaced equidistantly along the rotation, the first image frame may be centered at 5° with a 65° field of view. Accordingly, the display of the first image frame (assuming no zoom) would cover −27.5° to +37.5°. And thus, where there is some level of zoom present in the display, the viewer may retain the ability to pan left within the first image frame until the left-most end of the displayed view is at the −27.5° mark and the viewer may retain the ability to pan right within the last image frame until the right-most end of the displayed view is at the +217.5° mark.

Viewing of the image frames may be performed on a suitable digital viewing device, for example, a desktop computer, smartphone, tablet computer, AR/VR headset, etc. The digital viewing device may allow the viewer to pan along the non-rotated axis as well as along the axis of rotation and accordingly cycle through the image frames combined with "FOV Scanning". The viewing device panning method may include mouse input, touch input, gyroscope/accelerometer input, head tracking, etc.

As noted above, the viewer may step through multiple frames. This may be performed at a speed that is less than the speed of acquisition, greater than the speed of acquisition, or at the same speed as acquisition. However, in playback, where a large number of frames are stepped through within a relatively short period of time, it may not be necessary to display every image frame, as this might result in a display of a number of frames-per-second (FPS) that is beyond what can be appreciated by a viewer, and might require excessive computational resources. Accordingly, during such a display, intermittent frames may be skipped to keep the displayed FPS count below a reasonable level, which may be set according to the capabilities of the display device being used, which might be limited to a refresh rate of 30, 60, or 120 Hz, etc. as there is no need to display multiple image frames within a single refresh period of the display device. By dropping these frames, display may be performed using limited computational resources.

Frame transition may be handled in the manner described above. For the purpose of providing a thorough and complete disclosure, the following pseudocode is presented as an exemplary approach to performing frame transition in accordance with exemplary embodiments of the present invention. It is to be understood that the instant invention is not particularly limited to the use of this code:

```
animate( ) {
// Recursively call animate( ) on every display refresh cycle.
requestAnimationFrame(animate);
// Round the user's angular position along the rotational axis to the nearest
frame, newIndex = roundNearestFrame(userPosition);
// Only switch frames if the new calculated frame index is not equal to the
previous frame index
if (newIndex != previousIndex)
{
    // Set the previous index to the new frame index
    previousIndex = newIndex;
    // Set the new frame's angular position
    framePosition = 180 * (total_frames − newIndex) / (total_frames/2);
    // Display the new frame on the user's display
    displayFrame(newIndex);
}
// Update the view based on user input
updateView( )
}
```

Exemplary embodiments of the present invention may be able to provide depth-aware FOV scanning during image playback. According to this approach, the determination as to when to switch image frames takes into account the depth of the principal subject within the present field of view. As switching between image frames generally creates a jump between the parallax of the prior frame and the parallax of the subsequent frame, the visual perception of this jump can be lessened by determining the depth of the principal subject and then stepping the image frame either earlier or later based on the determined depth. This may be performed by first calculating a depth map for each frame using tools such as Depth Map Automatic Generator (DMAG). Then an offset may be applied to the angular domain based on an algorithmically derived target depth in each frame. Here, various algorithms could be applied for calculating the target depth (average depth, most interesting depth, etc.)

Exemplary embodiments of the present invention may also use yaw position offsets to correct for captured angular deviations. For frame capture methods where the angular position is derived using a formula, rather than by being measured directly, each frame may be captured at exactly the same angular distance (e.g. 1 degree for each frame). In the event there are deviations between the angular distances of proximate frames, the yaw position may be calculated for each frame using software such as Panotools and the calculated yaw position offset per frame may be saved in the metadata. During image playback, this yaw position offset may be read from the metadata and applied to the scanning protocol to enable smooth panning.

As exemplary embodiments of the present invention do not perform image stitching to display a panoramic representation of an environment, the horizontal and vertical viewing angle of image playback may be limited based upon the lens used during capture. For example, if a lens that captured 180×180 degrees was utilized, when a viewer looks (e.g. pans) directly up or down, they will see a partial image as the lens only captured half of the sphere. This non-imaged area may make up a significant portion of the frame if a lens captured less than 180 degrees vertically.

Exemplary embodiments of the present invention may utilize one or more techniques to reduce the visual distraction provided by these non-imaged areas: (1) The edge of the imaged region can be blended with the color of the non-imaged region, e.g., a fade to black. (2) The imaged region can be mirrored/stretched and possibly blurred onto the non-imaged region. (3) The opposing frame can be dynamically aligned in real time, e.g. if 360 images are captured in a rotation, when viewing frame 0, frame 180 can be dynamically aligned onto the non-imaged area. This approach might only be possible if the vertical field of view (FOV) captured is >=180 degrees. (4) A pre-stitched static 360 can be aligned in a similar manner to technique (3), but in this case, only 1 image needs to be utilized as the single stitched 360 already has the entire sphere's image data.

As described above, there may be a mask that reduces the visual contrast between the imaged and non-imaged areas. The alignment of this mask, in combination with the FOV scanning technique, may depend upon the number of frames currently streamed, and the horizontal/vertical FOV captured. Both the horizontal (where viewer H. FOV>captured H. Overlapping FOV) and vertical regions can benefit from this dynamic FOV masking.

If a user is viewing the non-stitched panorama, in accordance with exemplary embodiments of the present invention, and is gazing near the cusp of two contiguous frames, it's possible the user will see the image flicker/switch back and forth between these two frames rapidly. Depending upon the content of these frames, this could be visually distracting. Exemplary embodiments of the present invention may therefore provide Frame Switching Hysteresis to create a dampening effect in the alignment code that would reduce this flickering. For example, rather than always switching to the technically correct frame, exemplary embodiments of the present invention may stay on the previous frame longer, or until the user moves a sufficient amount (e.g. either by amount of degrees, acceleration, or velocity) to require displaying a new frame (e.g. based upon the overlapping FOV of frames and the viewing FOV).

According to exemplary embodiments of the present invention, multiple separately acquired non-stitched panoramas may be combined into a single non-stitched panorama composite as long as the angular separation between the frames is the same, or, where the angular separation is not the same, the yaw angle and angular domain of each frame may be established either via metadata or computationally. These composites can be of the same environment at multiple unique times, or they could be composites of multiple completely unique environments and times. For example, 0-90 degrees of rotation of a first non-stitched panorama ("A") are composited with 90-360 degrees of a second non-stitched panorama ("B").

While some exemplary embodiments of the present invention may capture a non-stitched panorama of a physical environment, other exemplary embodiments of the present invention may capture a non-stitched panorama of one or more objects in front of a green screen. In traditional green screen compositing it may be difficult to achieve natural integration due to the lack of depth data in both the captured green screen content, and the backdrop. Due to the parallax captured in non-stitched panoramas, in accordance with exemplary embodiments of the present invention, green screen integration may appear more natural. For example, two such non-stitched panoramas may be captured with the same angular separation between frames: one in front of a green screen, and another of an environment that will become the backdrop. Upon integration, the elements captured in the green screen non-stitched panorama may naturally move with the same amount of parallax as the elements captured in the backdrop.

Exemplary embodiments of the present invention may additionally provide for lens projection conversion on playback during the image display phase. These adjustments may include changing the projection type, creating a crop region and/or changing field of view, and adjusting optional lens and capture parameters such as horizontal/vertical shear, captured pitch, captured roll, lens distortion coefficients for a lens correction model, creating a single-camera view from stereo camera capture or creating a stereo-vision view from a single camera capture. For example, in a rotated single camera system, the left and right eye views are displaced not only in space but also in time. This allows for the interpupillary distance (IPD) to be defined at the time of viewing (vs. at capture time for a multi camera system) by choosing the angular distance between the left and right eye views. The chosen angular distance may be converted into a frame index offset (e.g. 5 degree separation results in a left eye frame index offset from right eye frame index of 10 frames). To correct for the "cross-eyed" arrangement of the left and right eye views in a rotated single camera system, the frames are aligned to a particular scene depth along the axis of rotation. This results in a reduction of usable FOV for the axis of rotation.

A panorama viewer may be able to automatically fall back to monoscopic viewing for angular regions where motion is detected. Moreover, by using software such as Panotools, the average control point error between contiguous frames may be calculated. Contiguous frame pairs that contain above a threshold amount of error may also be deemed to contain motion and the viewer may fall back to monoscopic viewing.

Exemplary embodiments of the present invention may also perform depth aware stereo alignment. To achieve more natural stereoscopic viewing, left and right eye views may be aligned based on a depth map created per frame using tools such as the Depth Map Automatic Generator (DMAG). Alignment may be based on an algorithmically derived target depth in each frame. Here, various algorithms could be applied for calculating the target depth (e.g. average depth, most interesting depth, etc.). Alignment can also be based on an algorithmically calculated depth of subjects in view as contained by a variable diameter circle in the center of the view or based on the user's gaze as detected by eye tracking hardware.

To simulate human eye focusing, regions of the frame may be dynamically blurred where they are calculated to be closer/farther than the algorithmically calculated depth of the center circle or out of view based on the detected user gaze.

As discussed above, exemplary embodiments of the present invention may also support panoramas of any arbitrary rotational degree span. Thus, in performing image acquisition, the camera may have been rotated for less than a full rotation, exactly one full rotation, or for more than one full rotation. Capturing more than a single revolution provides for viewing one point in space at multiple instances in time as a viewer pans through more than one revolution. Thus, when viewing such a panorama, the viewer, in advancing forward in image frames, may eventually begin to retrace angles already viewed, but at a later period of time, in which the scene may have changed somewhat.

Figure 7:
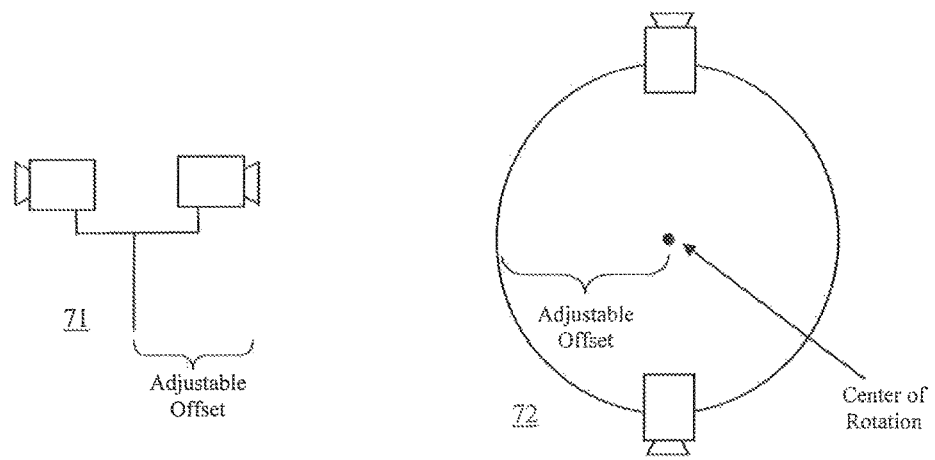
FIG. 7 is a diagram illustrating an apparatus for providing multiple camera support in accordance with an exemplary embodiment of the present invention.

Exemplary embodiments of the present invention may also provide for multiple camera view support. FIG. 7 is a diagram illustrating an apparatus for providing multiple camera support in accordance with an exemplary embodiment of the present invention. While only two cameras are illustrated, it is to be understood that any number of equally spaced cameras may be used. Arrangement 71 represents a side view of such an arrangement. As can be seen, both cameras are equally spaced from each other in the angular domain of rotation, although this is not necessarily the case. Arrangement 72 represents the top-down view of the arrangement 71.

Playback may allow for switching between 2 or more camera views, for example, two opposing cameras each capturing 360 frames in a 360 degree clockwise horizontal rotation in 60 seconds. On playback, the viewer can choose to switch between Camera 1 or Camera 2. Two cameras are described as a simple example, however, there is no limit to the number of supported cameras. Stereoscopic support requires two cameras for each view. In the above example there may be 4 cameras total, two facing forward and two facing in the opposite direction.

Exemplary embodiments of the present invention may also provide for low parallax grouping. Here frames where there is a low amount of parallax along the axis of rotation (e.g. frames containing only subjects at distance=infinity) and no motion, may be grouped together. The angular yaw position for each individual and grouped frame may then be saved to the metadata of the image set. Playback may then be optimized for use of individual frames and FOV scanning a grouped single frame. For example, 300 degrees use 400 real frames and 60 degrees share 1 single frame.

Exemplary embodiments of the present invention may also provide for frame interpolation. Here, frames may be interpolated, either during image processing or in real-time during display. The increased number of frames attributed to interpolation may simulate smoother motion and parallax transitions when panning along the axis of rotation. For simpler regions of the panorama (e.g. regions exhibiting little parallax or motion), real time interpolation may be enabled to reduce the data size of the panorama.

Exemplary embodiments of the present invention may also perform frame index detection. To ensure that the frame expected is the one that was returned by an asynchronous frame decoder (e.g. NVidia/Intel/AMD GPU accelerated h264 decoder), each frame may be stamped with a unique identifier (e.g. X by Y pixels with RGB color, barcode, QR code, text, etc.) when frames are encoded to a chosen format such as h264, h265, VP8, VP9, etc. The stamped identifier may then be read on each playback render cycle using respective technique to stamp used:

i. X by Y pixels with RGB color—Read pixel color ii. Barcode/QR code—Decode using Barcode/QR code software library iii. Text—Read using OCR (optical character recognition) software Exemplary embodiments of the present invention may also provide a playback optimizer. As not all viewing platforms will inform the playback engine when the desired frame is decoded, a test that informs the playback engine of the maximum playback FPS/resolution supported by the viewing platform, may be performed. Test files that contains various resolution/FPS combinations may be created. A "Frame index detection" technique may be used to play back all test files and record results. It may then be decided which resolution/FPS combination is optimal for given playback device. This optimal setting may be stored in the viewing device's cache as the default playback settings.

Exemplary embodiments of the present invention may also provide for real-time streaming playback. To allow for quick playback of panoramas on devices with slow network connections, various streaming approaches may be utilized depending on the desired viewing experience. For example, frames may be downloaded clockwise/counterclockwise starting from the same frame index. This maintains the smoothest motion and parallax transitions, but may sacrifice the ability to quickly see the entire captured rotation.

Frames may also be downloaded in a "star pattern" algorithm that fills in the next largest gap. This provides the most equitable distribution of frames during streaming.

Multiple complete buffers may be created with various frame skip intervals. For example, "Buffer A" may be created for FrameSkip=1 and "Buffer B" may be created for FrameSkip=8. Buffering may start with the largest FrameSkip buffer and FOV scanning may be performed while waiting for smaller FrameSkip buffers. Buffers may be downloaded in both forward and reverse directions starting from the same frame index, or the frame index where the viewer has currently panned to. This allows complete playback to start with a small number of frames (e.g. 24) and trades smooth parallax and motion transitions for quick playback of the entire rotation captured.

Adaptive bandwidth tiles may be used where each frame has multiple versions of various progressive compression quality settings. This may allow for smooth motion and parallax transitions, but may sacrifice quality initially.

Depending on the playback method utilized, some devices might not be able to keep all of the frames loaded in RAM for fast access. Exemplary embodiments of the present invention may accordingly implement a dynamic caching system that maintains both a fixed array of frames that forms the Initial Frame Set and a dynamic array of frames that loads the frames from the local disk into a RAM cache. This caching mechanism may dynamically calculate a safe number of frames to cache based on available RAM, and would keep an array of frames located to the left and right of the current viewing position. Multiple caches could be implemented such that varying densities of frames are cached depending on how far they are away from the current viewing position. For example, <5 degrees from current view may lead to the caching of all available frames, while >=5 degrees may lead to the caching of every other frame, etc.

Various streaming techniques, such as those described above, may be combined into hybrid streaming techniques. For example, the downloading of frames and the creation of buffers, as described above, may be combined so that the viewer can immediately view the complete rotation and also achieve smooth motion and parallax transitions near the starting viewpoint.

As discussed above, streaming approaches may provide various ways for allowing the viewing of an un-stitched panorama over a computer network such as the Internet, such that the viewing may begin before all frames are fully downloaded. To determine which frames should be streamed first, exemplary embodiments of the present invention may utilize one or more techniques: (1) Automated Regions of Interest: Here, frames streamed first would be based upon aggregate user analytics that determine which regions of the rotation are most important, most viewed, etc. (2) User Defined Keyframes for Streaming: Here, a photographer may desire that specific frames of the unstitched panorama are guaranteed to be visible upon initial viewing. User defined keyframes may allow the photographer to specify which individual frames to load initially, and which frames may be streamed.

Exemplary embodiments of the present invention may also provide for the conversion of stitched 360 degree video. Here, standard stitched 360 video may be converted from formats including, but not limited to, equirectangular or cubemap formats. However, using content already stitched has three primary drawbacks: (1) visible parallax stitching errors may be present for scenes with multiple depths, (2) no motion parallax is observed, for example, the viewer will not be able to perceive seeing around objects as they pan, and (3), extra layer of compression may result in lower quality. Accordingly, to convert already stitched 360 video in accordance with exemplary embodiments of the present invention, the following steps may be performed: (1) a start and end angular position may be defined, for example, in degrees, (2) a time period of rotation may be defined, and (3) frame skipping may be defined, where desired.

Exemplary embodiments of the present invention may also map sound to the experience of playback. The mapping of sound may be user defined or environment defined. In the case in which sound is user defined, the user may provide a soundtrack (e.g. ambient, music, etc.) and directly map the provided soundtrack to the viewer panning along the rotational axis or played back independent of the viewer panning. Here, multiple sound tracks may be mapped to unique angular regions along the rotational axis.

In the case in which sound is environmentally defined, sound that was captured during the image acquisition may be directly mapped to the viewing experience. For example, sound is played back forwards/backwards in time as the user pans along the rotational axis. The speed of the sound may be tied to the speed of the viewing rotation. Sound may be paused when the viewer is not panning, or sound could be played forwards in time from the time index the user stopped on.

Captured sound may alternatively be played back when the viewing experience is started without directly mapping the sound playback to the viewer's panning along the rotational axis.

In a hybrid approach, as it is understood that playing a sound backward may not be desired, captured sound might only be played when playback is moving forward in time, and perhaps only when moving forward at/or near the same speed as image acquisition was performed in. Sound could also be played back in reverse at a lower volume than the forward playback.

Regardless of the type of sound mapped to the experience it is possible to make use of surround sound through the use of surround sound capturing microphones. Moreover, depending on the type of sound mapped to the experience, it may be beneficial to increase/decrease the volume as the viewer pans along the rotational axis. For example, moving backwards in time with real environmental sound directly mapped to the viewing pan will play sound in reverse. This produces garbled sound which may be more comfortable to hear when at lower volumes.

The unstitched panoramas may be viewed with 3D computer-rendered elements superimposed therein. According to one exemplary embodiment of the present invention, depth that is captured through motion parallax (e.g. due to offset from NPP), may be used to automatically generate a depth map for each frame. This depth data can then be utilized to integrate real time generated graphics into the panorama. For example, a 3D model of a person could interact with objects photographically acquired as part of the unstitched panorama at their natural depth, and this 3D model may move completely independently from the viewer panning.

Figure 8:
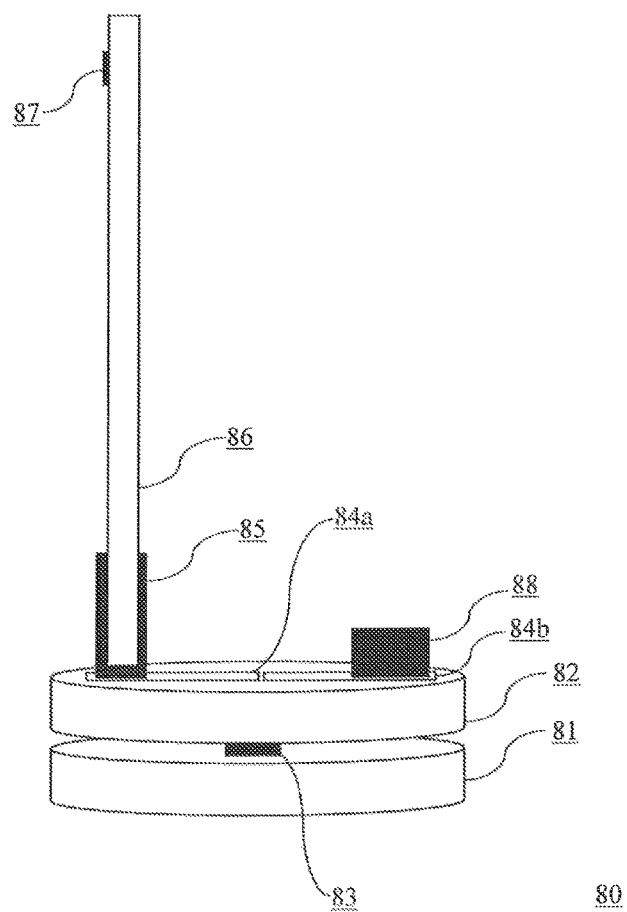
FIG. 8 is a diagram illustrating a rotating dock device for a mobile device in accordance with exemplary embodiments of the present invention.

As discussed above, exemplary embodiments of the present invention may be performed using a mobile device such as a smartphone or tablet computer. In this regard, the mobile device may be used to acquire the image frames, process the image frames and display the image frames. However, in performing these steps, assistance hardware may be employed. For example, the processing may be offloaded, in whole or in part, to a cloud-based service, as described above. In viewing the processed frames, the mobile device may again be used. However, assistance hardware may include a virtual reality (VR) headset, for example, one that the mobile device is inserted into. During image acquisition, assistance hardware may include a rotating dock device. FIG. 8 is a diagram illustrating a rotating dock device for a mobile device in accordance with exemplary embodiments of the present invention.

The rotating dock 80 may include a stationary platform 81, which may have a high-friction bottom surface, for example, including a rubber pad or coating. A rotating platform 82 may be disposed above the stationary platform 81. Each of the stationary platform 81 and the rotating platform 82 may be substantially circular or disk shaped, however, other shapes may be possible, and the two platforms need not share a common shape, as shown.

An actuator 83 may be disposed between the stationary platform 81 and the rotating platform 82. The actuator 83 may rotate the rotating platform 82 with respect to the stationary platform 81. The actuator 83 may be electronic or wind-up, as described above. The stationary platform 81 might also have a number of feet, such as three or four feet. Each foot may be adjustable in shape.

The rotating platform 82 may include, thereon, a mobile device dock 85. The mobile device dock 85 may operate to hold the mobile device 86 in a desired position so that a camera module 87 of the mobile device 86 can record a present scene. The mobile device dock 85 may be purely a mechanical coupling, although it may also include a dock connector for electronically coupling with the mobile device 86, for example, so that the mobile device could control or even power the rotating dock 80 or so the rotating dock 80 could control or even power the mobile device 86. However, electronic coupling may be performed by a wireless interface such as Bluetooth, WiFi or some other form of wireless control.

The mobile device dock 85 may be adjustable on the rotating platform 82 so that the desired offset may be established. Adjustability may be implemented by a first groove 84a within which the mobile device dock 85 may move closer or farther away from the axis of rotation.

The rotating platform 82 may additionally include a counterweight 88, which may be a relatively heavy object, such as a metal weight. The counterweight 88 may be designed to match the weight of the mobile device dock 85 plus the weight of an average mobile device, or a largest mobile device likely to be used in the rotating dock 80. The counterweight 88 may also be adjustable by the use of a second groove 84b in the rotating platform 82. The second groove 84b may be coupled with the first groove 84a such that the counterweight 88 moves away from the axis of rotation as the mobile device dock 85 is moved away from the axis of rotation, the counterweight 88 moves toward the axis of rotation as the mobile device dock 85 is moved toward the axis of rotation, etc.

It is to be understood that the adjustable counterweight feature described above with respect to FIG. 8 may be freely applied to other exemplary embodiments of the present invention, such as those depicted in FIGS. 1-4.

Figure 9:
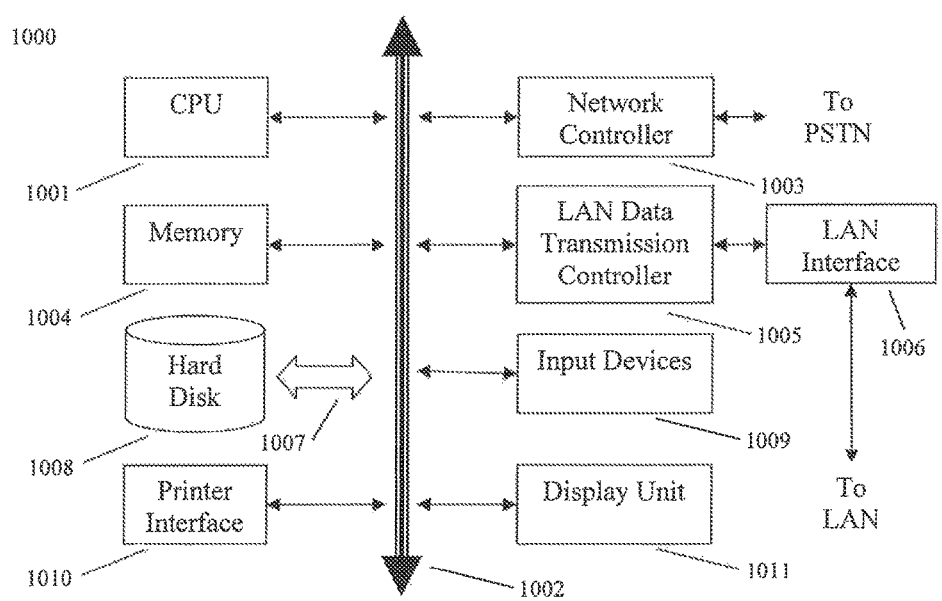
FIG. 9 shows an example of a computer system capable of implementing the method and apparatus according to embodiments of the present disclosure.

FIG. 9 shows an example of how a computer system may implement a method and system of the present disclosure, such as by performing image processing and/or image display. The system and method of the present disclosure may be implemented in the form of a software application running on a computer system, for example, a mainframe, personal computer (PC), handheld computer, server, etc. The software application may be stored on a recording media locally accessible by the computer system and accessible via a hard-wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure.

What is claimed is:

1. A method for acquiring and displaying a sequence of unstitched images, comprising:
    rotating a camera unit about an axis of rotation such that a distance between the axis of rotation and a no-parallax point or least-parallax point of the camera unit is fixed to a predetermined offset;
    acquiring a sequence of image frames, using the camera unit, as the camera unit is rotated about the axis of rotation; and
    sequentially displaying each of the sequence of image frames to a viewer, without stitching the sequence of image frames into a single panorama,
    wherein the predetermined offset is a positive distance value, and
    wherein each image frame of the sequence of image frames is displayed with a same level of parallax as the image frame was acquired with, each image frame of the sequence of image frames has a unique level of parallax with respect to the other image frames of the sequence of image frames, and no parallax correction is applied to any of the image frames of the sequence of image frames between acquisition and display thereof.

2. The method of claim 1, wherein the predetermined offset is within the range of 50 mm-120 mm.

3. The method of claim 1, wherein the predetermined offset is substantially 80-100 mm.

4. The method of claim 1, wherein the predetermined offset is substantially equal to an actual distance or an average distance between human eyes and an axis of rotation of a human head about a human neck.

5. The method of claim 1, wherein the sequence of image frames is acquired at regular angular intervals and at regular temporal intervals.

6. The method of claim 1, wherein the sequence of image frames is acquired as the camera unit is rotated over at least 360°.

7. The method of claim 1, wherein the sequence of image frames is acquired as the camera unit is rotated less than 360°.

8. The method of claim 1, wherein each of the sequence of image frames includes, as metadata, an acquisition yaw angle and an acquisition time.

9. The method of claim 1, wherein each of the sequence of image frames is processed, after acquisition, and prior to displaying, to convert an image format, to perform lens distortion correction, to crop, or to align orientation.

10. The method of claim 1, wherein in sequentially displaying each of the image frames to the viewer, the viewer uses a user interface element to step backwards and forwards through the sequence.

11. The method of claim 1, wherein in sequentially displaying each of the image frames to the viewer, the viewer uses a user interface element or a movement/position sensor to change an angle of view and the sequence of image frames is advanced and regressed as the angle of view is changed,
    wherein an angular field of each image frame of the sequence of image frames are overlapping,
    each image frame of the sequence of image frames is assigned a non-overlapping angular threshold, and
    the sequence of image frames is advanced and regresses as the angle of view is changed from an angular threshold of one image frame of the sequence of image frames to an angular threshold of a proximate image frame of the sequence of image frames.

12. The method of claim 1, wherein the angular threshold of each image frame of the sequence of image frames is established according to a corresponding acquisition yaw angle of the image acquisition and the number of frames captured.

13. A method for acquiring and displaying a sequence of unstitched images, comprising:
    rotating a camera unit about an axis of rotation such that a distance between the axis of rotation and a no-parallax point or least-parallax point of the camera unit is fixed to a predetermined offset;
    acquiring a sequence of image frames, using the camera unit, as the camera unit is rotated about the axis of rotation; and
    sequentially displaying each of the sequence of image frames to a viewer, without stitching the sequence of image frames into a single panorama,
    wherein the predetermined offset is a positive distance value, and
    wherein the predetermined offset is automatically determined in accordance with a size of a subject and a distance between the camera unit and the subject.

14. The method of claim 1, wherein the camera unit includes a left-eye image lens and a right-eye image lens, each image frame includes a left-eye image frame acquired from the left-eye image lens and a right-eye image frame acquired from the right-eye image lens, and the predetermined offset is a distance between the axis of rotation and a no-parallax point (NPP) or least-parallax point (LPP) of either the left-eye image lens or the right-eye image lens or the predetermined offset is a distance between the axis of rotation and a middle point of a line connecting the NPP/LPP of the left-eye image lens and the right-eye image lens.

15. The method of claim 14, wherein the left-eye image frame and the right-eye image frame are captured and displayed at substantially the same time to provide a three-dimensional display.

* * * * *